Aug. 2, 1927.  
E. W. BIERMAN  
TUBE SPLICING METHOD  
Original Filed July 14, 1925   3 Sheets-Sheet 1.  
1,637,466
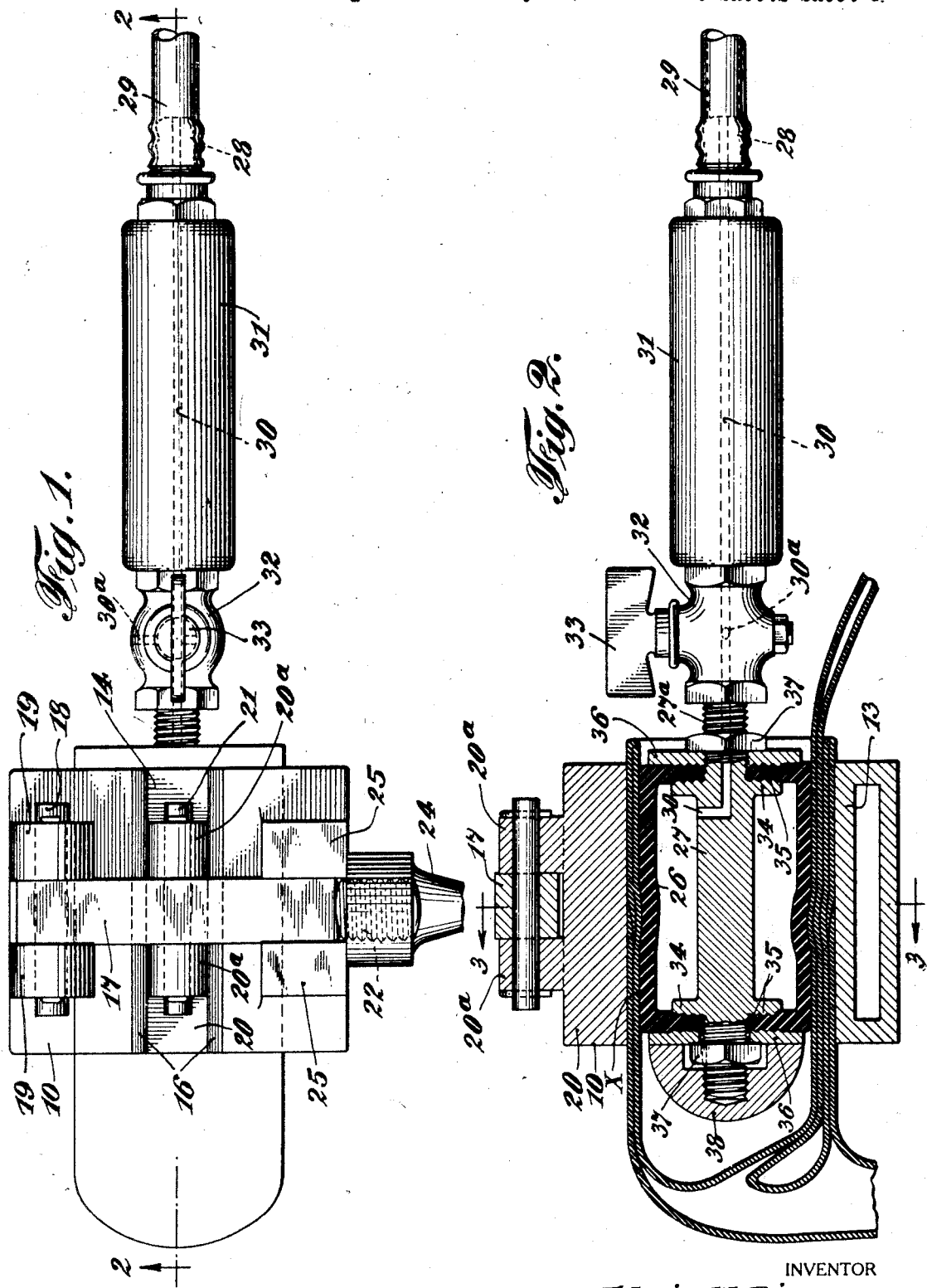
INVENTOR  
Edwin W. Bierman  
By George Kleinn  
his ATTORNEY Aug. 2, 1927.
E. W. BIERMAN
1,637,466
TUBE SPLICING METHOD
Original Filed July 14, 1925   3 Sheets-Sheet 2
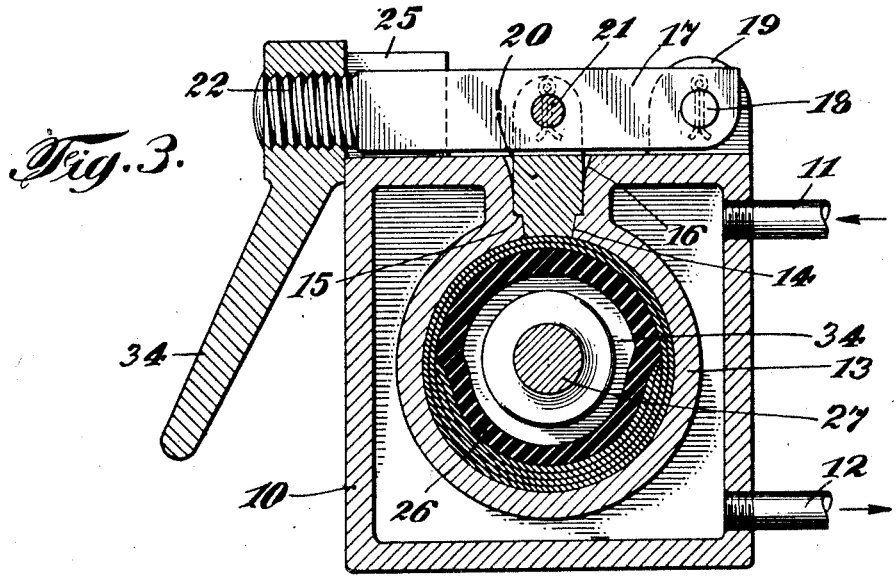
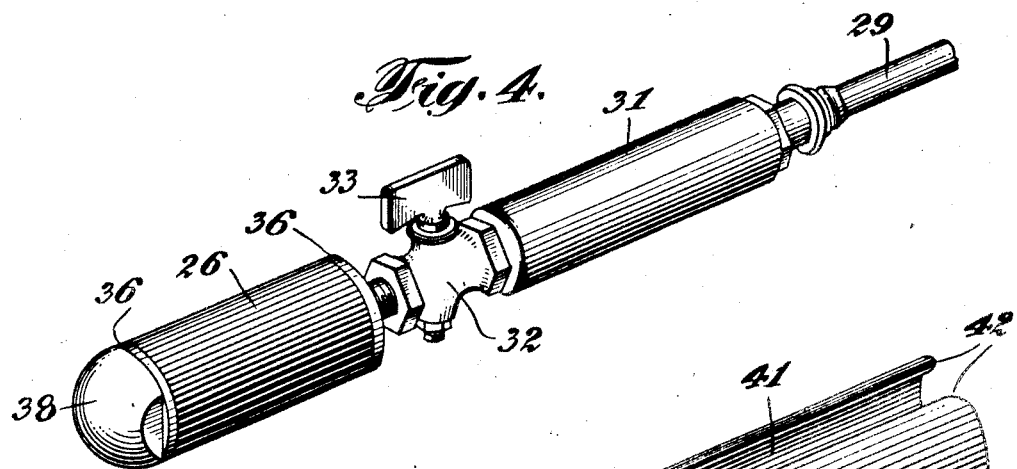
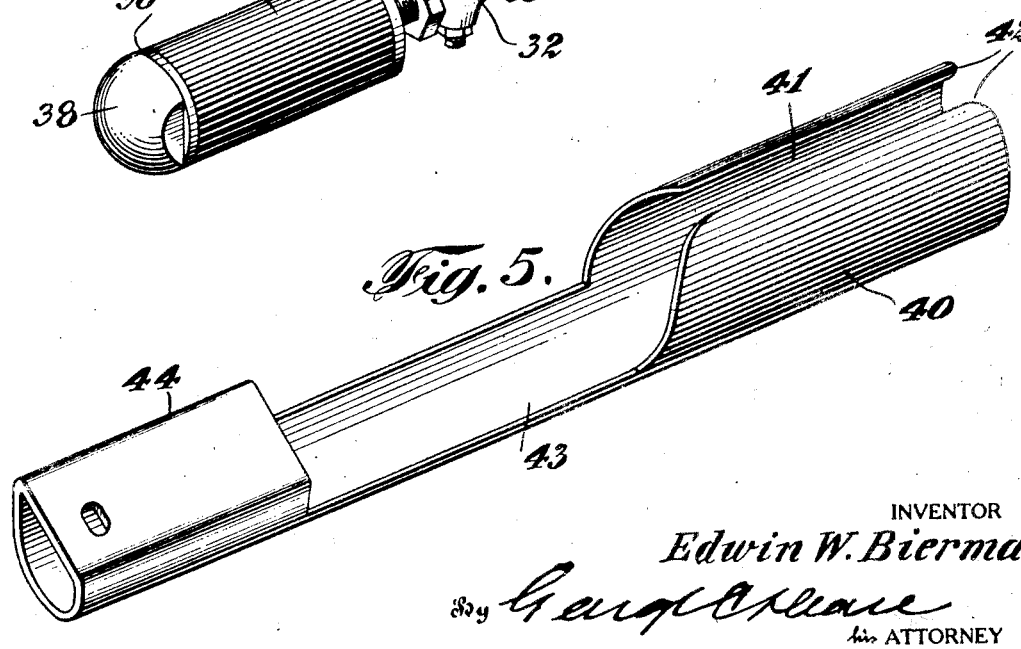
INVENTOR
Edwin W. Bierman
By George... 
his ATTORNEY Aug. 2, 1927.
E. W. BIERMAN
1,637,466
TUBE SPLICING METHOD
Original Filed July 14, 1925    3 Sheets-Sheet 3
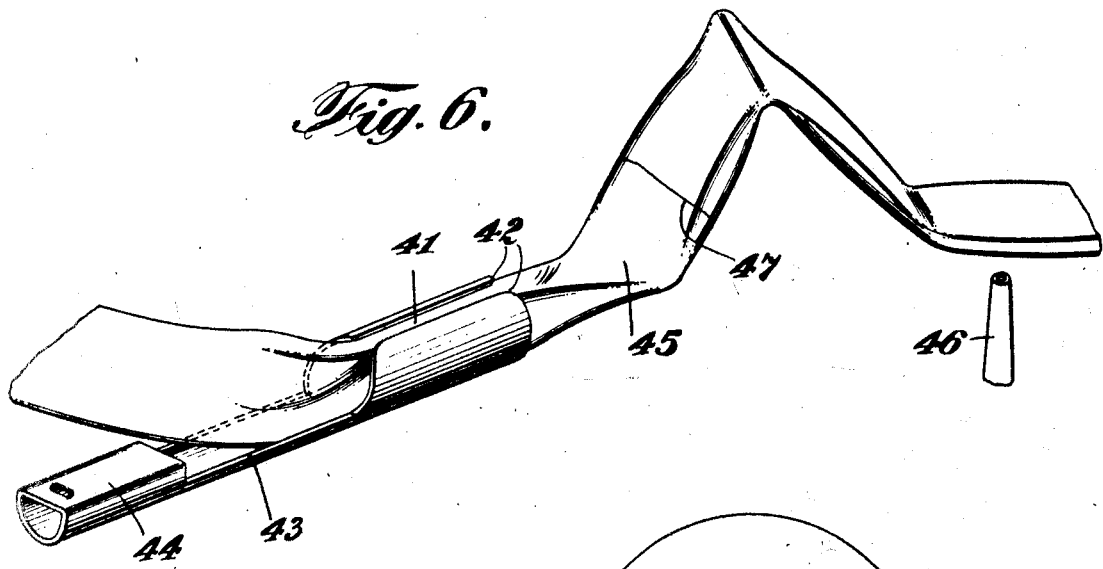
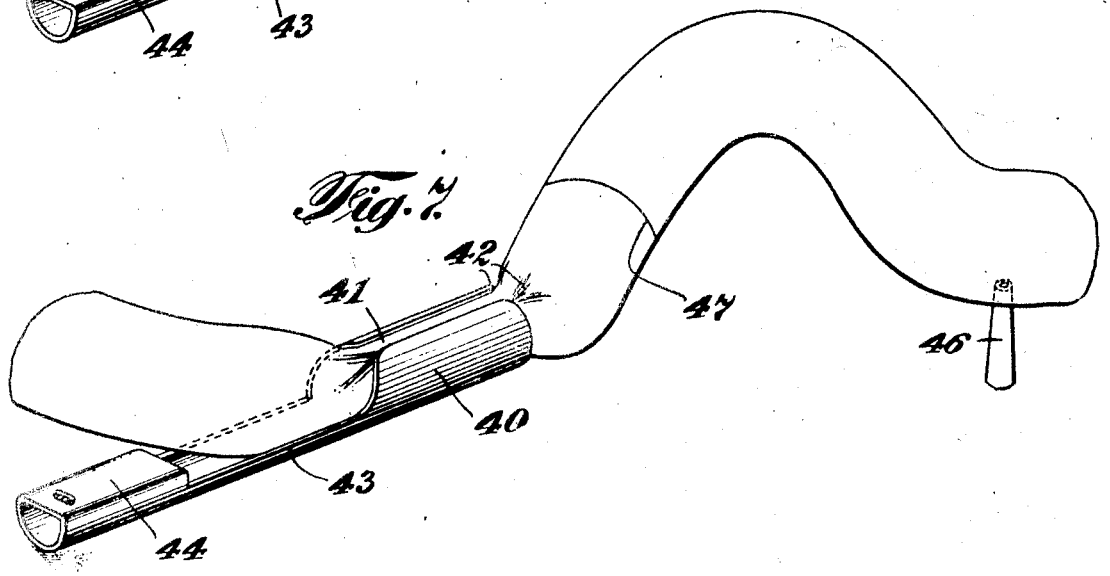
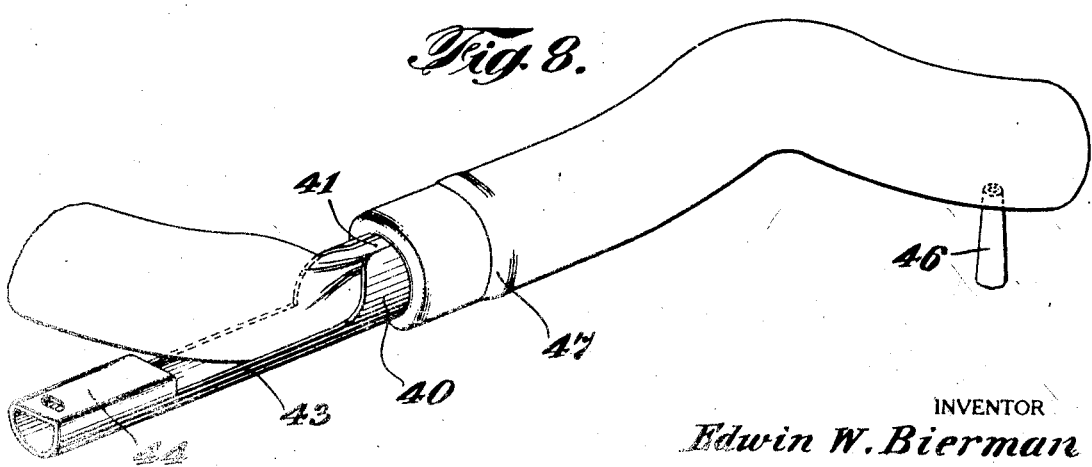
INVENTOR
*Edwin W. Bierman*
By *George Cleau*
his ATTORNEY Patented Aug. 2, 1927.

1,637,466

UNITED STATES PATENT OFFICE.

EDWIN W. BIERMAN, OF KEOKUK, IOWA, ASSIGNOR TO STANDARD FOUR TIRE CO., OF KEOKUK, IOWA, A CORPORATION OF IOWA.

TUBE-SPLICING METHOD.

Original application filed July 14, 1925, Serial No. 43,453. Divided and this application filed April 17, 1926. Serial No. 102,641.

My present invention relates to vulcanizing the splices of endless or annular tubes of rubber or the like, such as the inner tubes commonly used in automobile tires. It includes an improved method of folding or cuffing the endless tube prior to its introduction into the vulcanizing machine.

The apparatus employed includes a steam heated tube-enclosing mold that is substantially rigid, in combination with an elastic or non-positively operating expander which fits within the cuff of the tube and presses the splice outward into firm engagement with the inner surface of the mold.

Preferably the expander is in the nature of a flexible pneumatic tube or bag. The mold is steam jacketed throughout the major portion of its periphery and has a slot in one wall thereof through which the endless tube is entered, said slot being subsequently closed by a metallic key member, the inner end of which follows the curvature of the steam heated walls of the mold. This key becomes highly heated by conduction from the mold walls so that the entire annular splice is subjected to a substantially uniform temperature as well as a uniform pressure.

The folding or cuffing part of the method is extremely expeditious and simple, the tubes being made endless by splicing in any of the usual ways, are delivered to the mold in properly folded position and readily inserted thereinto with the annular splice in contact through its length with the mold walls.

The preferred method of cuffing includes inserting the endless tube in deflated condition through a narrow slot in an approximately cylindrical mandrel, inflating the tube, folding the tube back over the mandrel to form a two-ply cuff, with the splice on the outer surface thereof, then deflating the tube and removing the same from the mandrel.

For the vulcanizing part of the method, the expander is run into the cuff and separated from the hot mold walls by two plies of tubing throughout a semi-circumference and four plies of tubing throughout the other semi-circumference.

The invention may be more fully understood from the following description in connection with the accompanying drawings wherein:

Fig. 1 is a plan view of the apparatus;
Fig. 2 is a longitudinal section therethrough on the line 2—2 of Fig. 1;
Fig. 3 is a transverse section on the line 3—3 of Fig. 2;
Fig. 4 is a perspective view of the expander;
Fig. 5 is a perspective view of the cuffing mandrel; and
Figs. 6, 7 and 8 are perspective views illustrating successive steps in the operation of cuffing the tube.

In these drawings the vulcanizing mold is shown as comprising a steam chest 10, provided with inlet pipe 11 and outlet pipe 12, having a cylindrical inner wall 13 which forms the hot mold surface against which the tube splice is adapted to be held. The tube is entered into the mold through a slot 14 in the top thereof. This slot is shouldered as at 15 and tapered at 16 near its outer end.

A lever 17 pivoted on a pin 18 connecting a pair of ears 19 rising from the top of the mold carries at its intermediate portion a key or filler 20 for closing the slot 14, this key including ears 20ª pivoted on a pin 21 carried by the lever. The key is shaped to fit the shouldered slot and the tapered walls 15 readily guide the key into place as the lever is swung in position of Fig. 3. The key is thin enough to be easily heated to the required temperature by conduction from the steam heated mold, but may be hollow and itself heated, if desired.

The free end of the lever is threaded at 22 to accommodate locking nut provided with a handle 24, whereby the nut may be rotated into clamping engagement with blocks 25 rising from the top of the steam chest to lock the lever and thereby the key, in the closed position.

Cooperating with the mold to clamp a tube, is an expanding device including an air bag 26, preferably of heavy rubber with square molded ends, afforded by two cup members, one forming the entire mandrel surface and the other being coned and vulcanized therein as shown at $x$, Fig. 2. This is mounted on the end of a longitudinally extending tubular member having a handle 31 and formed at one end with a nipple 28 to which an air hose 29 is coupled and it has the air passage 30 extending from the nipple to the other end which connects with the stem 27ª that carries the air bag 26. The sections 27 and 27ª are connected by coupling member 32 in which I mount a manually operable valve 33 for controlling the air passage 30. Preferably this is a three port valve adapted to relieve pressure through vent 30ª when turned to cut off the air supply.

The section of the stem which carries the air bag is formed with a pair of spaced oppositely facing external flanges 34, the faces of which are ribbed as at 35 and coact with similarly ribbed flanges 36 to clamp the ends of the air bag. Lock nuts 37 around the threaded stem 27 retain the clamping nuts 36 in place and if desired, the end of the stem may receive a threaded boss or nut 38 having a smooth outer surface to protect the soft rubber of the tube and splice from contact with the corners of clamping nut 37 and the thread on which the latter screws.

The complete method of splicing includes properly cuffing the endless tube prior to its insertion into the mold and prior to the insertion of the expander within the tube.

The cuffing mandrel is shown in perspective in Fig. 5 wherein it will be noted that it includes a substantially cylindrical end 40 constituting a folding guide and narrow longitudinally extending slot 41 therein, the end corners of which are curved as at 42 to prevent catching or tearing the tubes. A shank 43 forms an extension of one side of the cylindrical end 40 and terminates in a handle member 44 of approximately semicircular cross-section. As seen in Fig. 6, the slot 41 permits a deflated endless tube 45 to be readily inserted within the cylindrical folding guide 40. After the tube has been inserted, it is inflated as in Fig. 7 through the usual air valve 46, the uncured initial splice being of course firm enough to permit this. This inflation makes the folding or cuffing operation very easy and the tube is folded back over the outside of the folding guide 40 in such a manner that the splice 47 therein is disposed on the outside of the double ply cuff. The tube is then deflated and the mandrel slipped out.

The properly cuffed tube is inserted through the slot 14 into the vulcanizing mold.

The lever 17 is then closed, swinging the key into operative position to close the mold. The handle 24 is rotated to lock the lever. The expanding air bag is then inserted into the cuffed tube as seen most clearly in Fig. 2.

After the expander has been inserted within the tube, the valve is turned to admit compressed air and any desired degree of pressure may be obtained to elastically clamp the splice or weld against the heated walls of the mold. When the valve 33 is turned to cut off supply through 30 and relieve the pressure through 30ª, the expander may be readily withdrawn, the handle 24 rotated, the lever swung upward to remove the key and the tube withdrawn through the slot 14.

It will be noted that throughout a semi-circumference of the mold there is only one thickness of rubber between the splice and the air bag, while there are three plies of rubber between the bag and the splice throughout the other semi-circumference of the cuff tube. But an important feature of my invention is that this will be immaterial so far as exerting proper pressure on the splice is concerned because the cylindrical portion of the expander is of heavy highly resilient rubber with fabric reenforced ends, and the pressure exerted at the surface of the mold 13 by the cylindrical portion is substantially the same whether exerted through two or four thicknesses of the rubber tubing. It is a fact, however, that considerably more heat from the mold 13 reaches the rubber mandrel 26 through the two plies than through the four plies. In course of time this heat tends to cause devulcanization of the rubber bag of the expanding mandrel so that if the valve is placed always in the upright position shown in the drawings, the upper side being always exposed to the greater heat coming through the two plies of the tube, will devulcanize much the faster and the mandrel bag will become warped. Hence, when assembling, the valve side should be turned downward as often as upward and in many cases I find it desirable to eliminate the valve at this point and locate it back in the line leading to the hose 29. Then the operator will have no incentive to insert the mandrel one side up and naturally it will average out that all sides are used uppermost approximately the same number of times and whatever devulcanizing will be symmetrical and will not warp the bag out of shape.

The method hereinafter claimed comprises subject matter originally claimed in my prior application, Ser. No. 43,453, filed July 14, 1925, of which this application is a division, and it is to be understood that the various implements described herein as useful in the preferred practice of my method, are claimed in said prior application and in Ser. No. 102,642, filed April 17, 1926.

I claim:

1. A method of curing tube splices which includes folding the tube upon itself to form a two-ply cuff surrounding a section of the tube and with the splice in the outer ply of the cuff, inserting the cuffed tube within a heated mold and inserting an expander within the cuff in such a manner that the expander is surrounded for a semi-circumference only by the two plies of the cuff and through its other semi-circumference by the two plies of the cuff and the two plies of tubing which are enclosed within the cuff, and operating the expander to firmly press the splice into engagement with the hot walls of the mold.

2. A method of curing splices of endless inner tubes, which includes placing a portion of the tube adjacent the splice within a cylindrical cuffing mandrel while the tube is in deflated condition, inflating the tube, folding the inflated tube over the outside of the mandrel to form a two-ply cuff with the splice in the outside ply, deflating the tube and withdrawing the mandrel; then vulcanizing said splice by inserting the cuff portion of the tube within a heated mold with an expander within the cuff and operating the expander to firmly press the splice into engagement with the hot walls of the mold.

3. The method of splicing rubber inner tubes for tires, which includes cementing the ends of each tube to form an endless tube or annulus, folding the tube upon itself to form a tube-like cuff surrounding a section of the tube and with the splice in the outer ply of the cuff, inserting the cuffed tube within a heated mold and inserting a rubber expander within the cuff in such manner that the expander is surrounded for a semi-circumference only by the two plies of the cuff and through its other semi-circumference by the two plies of the cuff and the two plies of tubing which are enclosed within the cuff, and inflating the rubber expander to firmly press the splice into engagement with the hot walls of the mold, removing said tube when the splice has been vulcanized by the heat and repeating said method with respect to each of the spliced tubes but, for different tubes, inserting the expander so that different portions of its rubber surface will be exposed to the heat conducted through the two-ply semi-circumference of the cuff.

4. A method of splicing inner tubes which includes inserting a section of the tubing through a slot in a cylindrical folding guide while the tube is in deflated condition, inflating the tube, folding the tube over the outside of the cylindrical folding guide to form a two-ply cuff on the exterior of said guide, deflating the tube and removing the cuffed tube from the guide; then inserting the cuffed tube within a heated mold and inserting an expander within the cuff in such a manner that the expander is surrounded for a semi-circumference only by the two plies of the cuff and through its other cemi-circumference by the two plies of the cuff and the two plies of tubing which enclosed within the cuff, and operating the expander to firmly press the splice into engagement with the hot walls of the mold.

5. A method of splicing tubes which includes placing a portion of the tube adjacent the splice within a cylindrical cuffing mandrel while the tube is in deflated condition, inflating the tube, folding the inflated tube over the outside of the mandrel to form a two-ply cuff with the splice in the outside ply, deflating the tube and withdrawing the mandrel; then inserting the cuffed tube within a heated mold and inserting an expander within the cuff in such a manner that the expander is surrounded for a semi-circumference only by the two plies of the cuff and through its other semi-circumference by the two plies of the cuff and the two plies of tubing which are enclosed within the cuff, and operating the expander to firmly press the splice into engagement with the hot walls of the mold.

Signed at Keokuk in the county of Lee, and State of Iowa, this 14th day of April, A. D. 1926.

EDWIN W. BIERMAN.